United States Patent Office 2,973,088
Patented Feb. 28, 1961

2,973,088

SELF-BONDING MATERIAL

Peter J. Canterino, Bartlesville, Okla., assignor to Phillips Petroleum Company, a corporation of Delaware No Drawing. Filed Aug. 23, 1956, Ser. No. 605,700

10 Claims. (Cl. 206—59)

This invention relates to a flexible, moisture-impervious material which is capable of forming a bond to itself.

In accordance with the present invention, there is provided a flexible, strong and moisture-imprevious material which is capable of forming a firm bond to itself, but which does not adhere to other substances such as wood, metal, or glass. This material is particularly well suited for use as a self-bonding tape. An article to be covered, such as a pipe line for example, can be wrapped with a tape which forms a moisture-impervious protective coating. The material of this invention is prepared by blending a chlorinated polymer and a plasticizer. The polymer employed as the starting material comprises polyethylene, a copolymer of ethylene and minor amounts of aliphatic 1-olefins, or mixtures of polyethylene and such copolymers. This polymer has a density of at least 0.94 at 25° C., a molecular weight of 20,000 or above, and a crystallinity of at least 70% when measured at 25° C. The polymer is chlorinated to form a material containing 40 to 60 weight percent chemically combined chlorine. From 2 to 25 parts by weight of a compatible plasticizer are blended with each 100 parts of the chlorinated polymer to form the final product. This material is non-tacky and forms a firm bond to itself in a matter of several hours at normal room temperatures.

Accordingly, it is an object of this invention to provide a material capable of forming a firm bond to itself, but which does not adhere to other substances.

Another object is to provide a self-bonding tape which adheres to its own backing to form a moisture impervious seal.

Another object is to provide a self-bonding tape which is non-tacky, but which forms a permanent bond to itself.

Other objects, advantages and features of the invention should become apparent from the following detailed description of a present preferred embodiment of the invention.

As previously mentioned, the starting polymeric material must have a density of at least 0.94 at 25° C., a molecular weight of 20,000 or above, and a crystallinity of at least 70% when measured at 25° C. It is preferred that crystallinity be at least 80% or higher at this temperature. The crystallinity of the polymer can be determined according to the method of Matthews, Peiser, and Richards, Acta Crystallographica, volume 2, page 85 (1945). Although the invention is not to be considered as limited by any theory expressed herein, it is believed that the specified high density and crystallinity indicate a predominantly straight chain polymer structure with a low degree of branching.

The olefin polymers employed in forming the self-bonding material of this invention preferably are produced by the method set forth in the copending application of Hogan and Banks, Serial No. 573,877, filed March 26, 1956. The polymeric starting material suitable for use as the starting material can be produced by contacting ethylene or ethylene and small amounts of other 1-olefins having no more than four carbon atoms per molecule with a catalyst comprising, as an essential ingredient, chromium oxide, preferably including a substantial amount of hexavalent chromium, as described in the aforementioned application. The chromium oxide is ordinarily associated with at least one other oxide, particularly at least one oxide selected from the group consisting of silica, alumina, zirconia, and thoria. The temperature for the polymerization reaction is usually in the range from about 100 to 500° F., with a temperature in the range of 150 to 375° F. being preferred for the polymerization of ethylene alone. The polymerization normally is conducted with the olefin in admixture with a hydrocarbon which can be maintained in the liquid phase and is inert under the polymerization conditions. Suitable hydrocarbons are paraffins and cycloparaffins, e.g., normal hexane, 2,2,4-trimethylpentane, cyclohexane and methylcyclohexane. A continuous slurry-type reaction technique can be employed, the catalyst being in powdered form, e.g., 40 to 100 mesh, and suspended in the hydrocarbon solvent. A pressure sufficient to maintain the solvent in the liquid phase is normally employed, e.g., 200 to 700 p.s.i. When employing a suspended catalyst, a polymerization temperature in the range of 200 to 325° F. is generally employed. In practicing the instant invention, it is preferred to use polyethylene as the starting material.

Other polymers which are suitable for use as the starting material in accordance with this invention include ethylene polymers which are prepared by polymerizing 1-olefins in the presence of a two or more component catalyst wherein one component is (1) an organo metal compound, including those where one or more organo groups is replaced by a halogen; (2) a metal hydride; or (3) a metal of group I, II, or III; and the second component is a group IV to VI metal compound. Specific examples of such two component catalysts include ethylaluminum sesquichloride plus titanium tetrachloride, lithium aluminum hydride plus titanium tetrachloride, ethylaluminum sesquichloride plus titanium butoxide, triethylaluminum plus titanium tetrachloride, ethylaluminum sesquichloride plus chromyl chloride, and triisobutylaluminum plus titanium tetrachloride. Applicable two component catalysts and polymerization methods are more fully described in copending application Serial No. 576,135, filed April 4, 1956, by W. B. Reynolds et al.

The preferred starting material employed in accordance with this invention is an ethylene polymer. However, copolymers of ethylene and minor amounts of aliphatic 1-olefins having no more than 4 carbon atoms per molecule can be employed in the same manner. The amount of olefin other than ethylene must be present in relatively small amounts, generally 10% or less, because the crystallinity decreases as the amount of such other olefins increases. The term "polymer" is employed herein to designate either homopolymers or copolymers.

These olefin polymers can be chlorinated by any known method. One preferred method of chlorination is described in copending application Serial No. 442,891, filed July 12, 1954, by P. J. Canterino. In general, this method involves dissolving the polymer, such as polyethylene, in a volatile solvent, such as carbon tetrachloride, at a temperature above the normal boiling point of the solvent and a superatmospheric pressure sufficient to maintain the solvent substantially in the liquid phase, e.g., 80 to 120° C. and 5 to 100 p.s.i.g. A chlorination agent is then added. Usually, elemental chlorine is passed through the solution until a partially chlorinated product, generally containing about 15 weight percent combined chlorine, is obtained. This intermediate product is soluble in carbon tetrachloride at atmospheric pressure and at temperatures up to the boiling point of carbon tetrachloride. The temperature and the pressure are then lowered, e.g., to between 50 and 70° C. and atmospheric pressure, and the chlorination is continued to the desired extent. The solvent can be removed by volatilization and the chlorinated polymer recovered as a residue. Alternatively, an antisolvent can be added to precipitate the chlorinated polymer which can then be recovered by filtration.

Another suitable chlorination method is described in copending application Serial No. 446,666, filed July 9, 1954 by Canterino and Baptist. This method involves conducting the initial chlorination (up to at least about 15 weight percent combined chlorine) with the polymer in solution in a solvent such as 1,1,2,2-tetrachloroethane, and any further chlorination desired can be conducted with carbon tetrachloride or a similar compound as the solvent.

The chlorinated content of the olefin polymer must be kept within the range of 40 to 60 weight percent chemically combined chlorine in order to obtain the product of this invention. Polymers of lower chlorine content are too soft and rubbery to be suitable for a tape of the type herein described because they are not capable of forming a strong film. Polymers having a higher chlorine content are too stiff to be manipulated, and the addition of sufficient plasticizer to overcome such stiffness results in the composition becoming too soft and tacky for use as unsupported tape.

Plasticizers which are blended with the chlorinated ethylene polymers must be materials which are compatible therewith. Such plasticizers can include epoxy resins, esters of organic acids, and phosphate esters. Specific examples of plasticizers which can be so employed include dimethyl phthalate, diethyl phthalate, dibutyl phthalate, dihexyl phthalate, dioctyl phthalate, triethyl sebacate, tributyl sebacate, dinonyl adipate, diethylene glycol oleate, triethylene glycol stearate, pentamethylene glycol glutarate, trimethyl phosphate, triethyl phosphate, tributyl phosphate, trinonyl phosphate, and tricresyl phosphate. Plasticizers are generally employed in amounts in the range from 2 to 25, or preferably 10 to 15, parts by weight per 100 parts of the chlorinated polymer. The test of compatibility is merely one of blending the polymer and plasticizer and observing to determine if the plasticizer bleeds out.

The self-sealing or cohesive tape of this invention effects a firm, permanent bond to its own backing when it is wound upon itself, but it does not bond to other surfaces such as wood, glass, or metal. It is prepared by blending a chlorinated olefin polymer containing from 40 to 60 weight percent chlorine with a suitable plasticizer. This blending can be effected in any convenient manner, such as in a Banbury mixer or on a roll mill. The composition thus prepared can be formed into a sheet by any procedure, such as by rolling in through a calender roll until it has been reduced to the desired thickness. The resulting sheet can then be wound onto rolls. Any suitable material such as cloth, cellophane, or the like, which acts as a separator between the layers of tape, is simultaneously wound onto the roll with the compound. When the winding operation is complete, the roll of tape can be cut to the desired width. When applying the tape, the separator material is removed and the tape is wound tightly around the object to be covered. A firm bond is generally formed in 4 or 5 hours where the layers overlap. The time required for bonding depends to some extent on the temperature. Longer bonding times are required at lower temperatures.

The self-sealing tape of this invention is flexible, strong, and impervious to moisture. It is particularly suitable for such application as wrapping pipes for pipelines and other underground applications as it will fuse together to provide a moisture and salt barrier. It is also useful as electrical tape because it is a non-conductor of electricity. It can easily be applied because it is non-tacky.

The following examples are exemplary of this invention.

*Example I*

Ethylene was polymerized in a continuous process in the presence of a chromium oxide-silica-alumina catalyst to give a product having the following properties:

| | |
|---|---|
| Density | 0.961 |
| Melt index [1] | [2] 0.54 |
| Melting point, ° F | 251±2 |
| Impact, Izod, ft. lbs./in. notch [3] | 3.6 |
| Compression molded: [4] | |
|   Tensile, p.s.i | 4250 |
|   Elongation, percent | 19 |
| Injection molded: [5] | |
|   Tensile, p.s.i | 4950 |
|   Elongation, percent | 34 |
|   Heat distortion, ° F. [6] | 175 |
|   Stiffness, p.s.i. [7] | 130,000 |
| Crystallinity, percent [8] | Over 90 |

[1] ASTM D1238–52T.
[2] Equivalent to molecular weight of 43,400.
[3] ASTM D256–47T.
[4] ASTM D412–51T.
[5] ASTM D638–52T.
[6] ASTM D648–45T.
[7] ASTM D747–50.
[8] Nuclear magnetic resonance method.

A polymer having the above characteristics can be prepared, for example, by a continuous operation in a 60-gallon reactor that is provided with a stirrer. The catalyst employed is a chromium oxide-silica-alumina composition containing 2.5 weight percent chromium as chromium oxide. The solvent employed is cyclohexane. The following operating conditions are employed:

| | |
|---|---|
| Cyclohexane feed rate, lbs./hr | 160 |
| Ethylene feed rate, cu. ft./hr | 350 |
| Temperature, ° F | 275 |
| Pressure, p.s.i.g | 420 |
| Residence time, hours | 2 |
| Catalyst concentration in reactor, weight percent | 0.3 |
| Polymer concentration in reactor, weight percent | 8 |

The ethylene polymer was chlorinated using the following proportions of ingredients:

| | Pounds |
|---|---|
| Ethylene polymer | 2.1 |
| Chlorine | 2.03 |
| Carbon tetrachloride | 50 |

The ethylene polymer and carbon tetrachloride were charged to a 5-gallon glass-lined reactor provided with a stirrer. Air was removed by flushing the reactor with nitrogen, the vessel was closed, and the mixture was heated to 250° F. and maintained at 245–250° F. for 1.5 hours to dissolve the polymer. Pressure in the reactor was 41 p.s.i.g. and it was held at this level throughout the reaction with the aid of nitrogen. Chlorine was introduced (0.2 pound) and then an ultraviolet lamp, placed in a thimble that extended down into the vessel, was turned on and left on throughout the reaction. Chlorine was added at a constant rate over a 4-hour period until a total of 2.03 pounds had been introduced. Hydrogen chloride was bled off during the reaction. During addition of the chlorine, the temperature dropped gradually to 160° F. The batch was then transferred to a 10-gallon glass-lined kettle and cooled. The pressure was bled down to atmospheric with nitrogen being passed through the kettle to strip out hydrogen chloride and unreacted chlorine. The material was then run into a coagulation vessel containing boiling water to which sodium hydroxide had been added to give a pH of 9. More sodium hydroxide was added periodically to maintain the pH at around 9. This treatment coagulated the chlorinated polymer and volatilized the carbon tetrachloride. Lumps of coagulum were cut into small pieces and dried in an air oven for 16 hours at 150° F. The dried material was frozen with Dry Ice, chopped in a Wiley mill, washed with cold water, and dried 16 hours at 150° F. The product was analyzed for chlorine, which was 23.6 weight percent.

The chlorinated polymer was then chlorinated further. The ingredients were used in the following proportions:

| | Grams |
|---|---|
| Chlorinated polymer, 23.6% chlorine | 250 |
| Chlorine | 250 |
| Carbon tetrachloride, 4 liters | 6380 |

The chlorinated polymer and carbon tetrachloride were charged to a reactor provided with a stirrer, the mixture was heated to 60° C., and after the polymer was dissolved, chlorine was introduced at the rate of approximately 60–80 grams per hour while the mixture was stirred. The reaction was effected in the presence of ultraviolet light. After addition of the chlorine, the mixture was poured into isopropyl alcohol, the precipitated chlorinated polymer was washed with isopropyl alcohol, and dried in a vacuum oven at 60° C. for 16 hours. The product contained 49.2 weight percent chlorine.

Several formulations were prepared by the addition of variable quantities of dioctyl phthalate to samples of the above chlorinated ethylene polymer (49.2 weight percent chlorine). A small quantity of a heat stabilizer, a barium-cadmium fatty acid soap (Witco 70), was added to each composition. One sample was prepared without dioctyl phthalate and was used as a control. The various formulations were as follows:

| | Parts by Weight | | | | | |
|---|---|---|---|---|---|---|
| | A | B | C | D | E | F |
| Chlorinated polymer | 40 | 40 | 40 | 40 | 40 | 40 |
| Dioctyl phthalate | 2 | 4 | 6 | 8 | 10 | 0 |
| Witco 70 | 1 | 1 | 1 | 1 | 1 | 1 |

The compositions were mixed on a roll mill, sheeted off, and pressed out into films approximately 5–10 mils in thickness in a Carver press at 190° F. and 14,000 p.s.i. Strips 1" x 2" were cut from each sample. Two strips from the same sample were placed, one on the other, and a strip of holland cloth about 0.5 inch in width was placed across one end to leave the ends free for placing in an Instron machine. After assembling the test specimens in this manner, a wooden rod was roller over them and they were allowed to stand 16 hours with no further pressure being exerted on the specimens.

A test specimen made from Polyken pressure sensitive polyethylene tape (Kendall Company product) was included in the series for comparative purposes. It has a smooth side and an adhesive side. Strips 1" x 2" were employed with the adhesive side of one strip being placed on the smooth side of the other. The strips were pressed together in the same manner as for the other test specimens and were allowed to stand overnight (about 24 hours).

Peel strength was determined by placing the free ends of each test specimen in the jaws of an Instron machine. The cross-head speed was 2 inches per minute. The lb./in. pull was measured in each case. Results were as follows:

| | A | B | C | D | E | F | Polyken |
|---|---|---|---|---|---|---|---|
| lbs./In | 2.3 | 3.3 | 2.8 | 2.3 | 1.6 | 1.1 | 1.3 |

*Example II*

Ethylene was polymerized in a continuous process using a reactor provided with a stirrer. Polymerization was effected in the presence of a chromium oxide-silica-alumina catalyst (2.5 weight percent chromium as chromium oxide) using cyclohexane as the solvent. Polymer concentration in the reactor was 8 weight percent, catalyst concentration was 0.50 weight percent, and the residence time was 3 hours. The reaction was effected at a temperature of 280° F. and at a pressure of 420 p.s.i.g. The physical properties of the product were as follows:

| | |
|---|---|
| Molecular weight [1] | 37,600 |
| Melt index [1] | 1.37 |
| Volatiles, weight percent | 0.02 |
| Ash, weight percent | 0.001 |
| Crystallinity, percent [1] | above 90 |

[1] As in Example I.

Two hundred grams of the ethylene polymer and 4 liters of tetrachloroethane were charged to a reactor, air was removed by flushing the reactor with chlorine, the mixture was heated to 115° C. to dissolve the polymer, and 510 grams of chlorine was introduced, with stirring, at the rate of approximately 60–80 grams per hours. The reaction was effected in the presence of ultraviolet light. The temperature during the addition of chlorine was maintained at 110–115° C. After addition of the chlorine, the mixture was poured into isopropyl alcohol, filtered, and the coagulated polymer was redissolved in chloroform. The solution was poured into isopropyl alcohol to effect coagulation of the chlorinated polymer, which was then washed with isopropyl alcohol and dried in a vacuum oven at 60° C. for 15 hours. Analysis showed a chlorine content of 52.4 weight percent.

Five grams of dioctyl phthalate was mixed on a roll mill with 60 grams of the chlorinated polymer. The physical properties of the composition and also on a sample of the chlorinated polymer which contained no plasticizer were determined. The results were as follows:

| | Chlorinated Polymer + Plasticizer | Chlorinated Polymer |
|---|---|---|
| Compression molded at 250° F.: [1] | | |
| Tensile, p.s.i | 1,386 | 2,045 |
| Elongated, percent | 580 | 180 |
| No strength temperature, ° F | 130 | 170 |
| Flex temperature, ° F | 26 | 61 |

[1] ASTM D412-51T.

The chlorinated polymer containing the plasticizer (dioctyl phthalate) was non-tacky to touch, but when left in contact with itself for several hours, it showed blocking or sticking together. A strip of this material approximately ⅜ inch wide and ¹⁄₁₆ thick was wrapped tightly around a wooden rod and allowed to stand 24 hours. When observed at the end of this period, the strip had stuck together where it overlapped, but the composition had not adhered to the wood.

The foregoing examples show that a non-tacky, self-bonding material is formed by this invention. While the invention has been described in conjunction with present preferred embodiments, it obviously is not limited thereto.

What is claimed is:

1. A material which is capable of adhering to itself consisting essentially of a blend of (1) a chlorinated polymer of aliphatic 1-olefins having no more than four carbon atoms per molecule, the polymer prior to chlorination having a density of at least 0.94 at 25° C. and a crystallinity of at least 70% at 25° C., said polymer containing between 40 and 60 weight percent chemically combined chlorine, and (2) from 2 to 25 parts by weight per 100 parts of chlorinated polymer of a plasticizer compatible therewith.

2. A material which is capable of adhering to itself consisting essentially of a blend of (1) a chlorinated polymer of ethylene which has a density of at least 0.94 at 25° C. and a crystallinity of at least 80% at 25° C.

prior to chlorination, the chlorinated polymer containing between 48 and 55 weight percent chemically combined chlorine, and (2) from 2 to 25 parts by weight per 100 parts of chlorinated polymer of a plasticizer compatible therewith.

3. A material which is capable of adhering to itself consisting essentially of a blend of (1) a chlorinated polymer of aliphatic 1-olefins having no more than four carbon atoms per molecule, the polymer prior to chlorination having a density of at least 0.94 at 25° C. and a crystallinity of at least 70% at 25° C., said polymer containing between 40 and 60 weight percent chemically combined chlorine, and (2) from 2 to 25 parts by weight per 100 parts of chlorinated polymer of a plasticizer compatible therewith, said plasticizer being selected from the group consisting of epoxy resins, esters of organic acids, and phosphate esters.

4. A material which is capable of adhering to itself consisting essentially of a blend of (1) a chlorinated polymer of ethylene which has a density of at least 0.94 at 25° C. and a crystallinity of at least 80% at 25° C. prior to chlorination, the chlorinated polymer containing from 48 to 55 weight percent chemically combined chlorine, and (2) from 10 to 15 parts by weight per 100 parts of chlorinated polymer of a plasticizer compatible therewith.

5. The material of claim 4 wherein said plasticizer comprises dioctyl phthalate.

6. The method of forming a material which is capable of adhering to itself which comprises polymerizing aliphatic 1-olefins having not more than four carbon atoms per molecule to form a polymer which has a density of at least 0.94 at 25° C. and a crystallinity of at least 70% at 25° C., chlorinating said polymer to produce a chlorinated polymer containing from 40 to 60 weight percent chemically combined chlorine, and admixing with said chlorinated polymer from 2 to 25 parts by weight per 100 parts of the chlorinated polymer of a plasticizer compatible therewith.

7. The method of claim 6 wherein the 1-olefins are polymerized at a temperature in the range of 100 to 500° F. in the presence of a catalyst comprising chromium oxide, including a substantially proportion of hexavalent chromium, associated with at least one oxide selected from the group consisting of silica, alumina, zirconia, and thoria.

8. The method of claim 6 wherein the 1-olefins are polymerized in the presence of a catalyst containing as essential components an organometal compound of a metal selected from the group consisting of groups I, II, and III of the periodic table of elements, and a compound of a metal selected from the group consisting of groups IV, V, and VI of the periodic table of elements.

9. The method of forming a material which is capable of adhering to itself which comprises ethylene to form a polymer which has a density of at least 0.94 at 25° C. and a crystallinity of at least 70% at 25° C., chlorinating said polymer to produce a chlorinated polymer containing from 40 to 60 weight percent chemically combined chlorine, and admixing with said chlorinated polymer from 2 to 25 parts by weight per 100 parts of the chlorinated polymer of a plasticizer compatible therewith.

10. A tape comprising a roll of alternate layers of a first flexible material and a second material which is capable of adhering to itself and which comprises a blend of (1) a chlorinated polymer of aliphatic 1-olefins having no more than four carbon atoms per molecule, the polymer prior to chlorination having a density of at least 0.94 at 25° C. and a crystallinity of at least 70% at 25° C., said polymer containing between 40 and 60 weight percent chemically combined chlorine, and (2) a plasticizer compatible therewith.

References Cited in the file of this patent

UNITED STATES PATENTS

| | | |
|---|---|---|
| 2,395,668 | Kellgren et al. | Feb. 26, 1946 |
| 2,422,919 | Myles et al. | June 24, 1947 |
| 2,481,188 | Babayan | Sept. 6, 1949 |
| 2,714,562 | Hechtman | Aug. 2, 1955 |

FOREIGN PATENTS

| | | |
|---|---|---|
| 623,705 | Great Britain | May 20, 1949 |